United States Patent
Krämer et al.

(10) Patent No.: US 8,603,610 B2
(45) Date of Patent: Dec. 10, 2013

(54) EDGE TRIM FOR PIECES OF FURNITURE

(75) Inventors: Uwe Krämer, Rehau (DE); Peter Glaser, Rehau (DE)

(73) Assignee: Rehau AG + Co, Rehau (DE)

( * ) Notice: Subject to any disclaimer, the term of this patent is extended or adjusted under 35 U.S.C. 154(b) by 663 days.

(21) Appl. No.: 12/666,649

(22) PCT Filed: Jun. 6, 2008

(86) PCT No.: PCT/EP2008/004520
§ 371 (c)(1),
(2), (4) Date: May 21, 2010

(87) PCT Pub. No.: WO2009/026977
PCT Pub. Date: Mar. 5, 2009

(65) Prior Publication Data
US 2010/0227128 A1    Sep. 9, 2010

(30) Foreign Application Priority Data

Aug. 24, 2007  (DE) .................... 20 2007 011 911 U

(51) Int. Cl.
*B32B 7/12*    (2006.01)
(52) U.S. Cl.
USPC ............... 428/192; 156/272.2; 428/195.1; 428/345; 428/511
(58) Field of Classification Search
USPC ............ 428/192, 195.1, 511, 345; 156/272.2
See application file for complete search history.

(56) References Cited

U.S. PATENT DOCUMENTS 5,989,657 A * 11/1999 Wurz et al. .................. 428/31
2004/0030384 A1 * 2/2004 Wissman .................. 623/11.11

FOREIGN PATENT DOCUMENTS

| DE | 2 123 182 | 11/1972 |
| DE | 34 45 450 | 6/1986 |
| DE | 3829675 | 3/1990 |
| DE | 42 15 755 | 6/1993 |
| EE | 1 163 864 | 12/2001 |
| EP | 1 080 854 | 3/2001 |
| WO | WO 2006/050899 | 5/2006 |

OTHER PUBLICATIONS

International Search Report, Jun. 11, 2008.

* cited by examiner

*Primary Examiner* — Mark Ruthkosky
*Assistant Examiner* — Christopher Polley
(74) *Attorney, Agent, or Firm* — Da Vinci Partners LLC; John Moetteli

(57) ABSTRACT

The invention relates to an edge trim for pieces of furniture, comprising a meltable film. In order to improve a generic edge trim such that the same is more versatile and can especially be mounted on a wider selection of surfaces, the molecular structure of the meltable film contains both polar and non-polar parts.

24 Claims, 1 Drawing Sheet

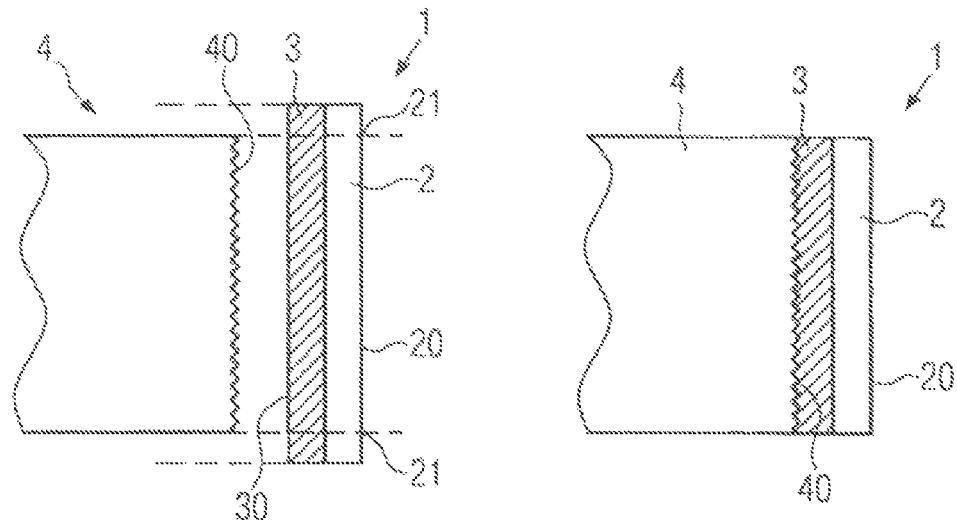
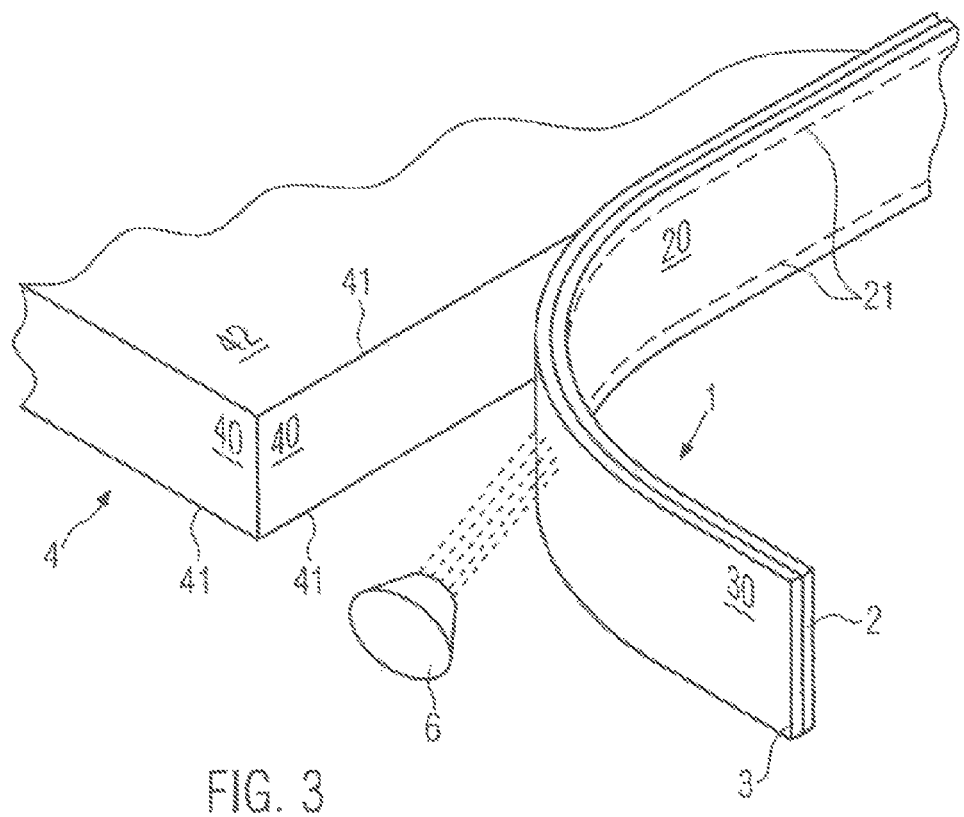

EDGE TRIM FOR PIECES OF FURNITURE

CROSS REFERENCE TO RELATED APPLICATIONS

This application is the National Stage of International Application No. PCT/EP2008/004520, filed Jun. 6, 2008, which claims benefit under 35 USC §119(a), to German patent application Ser. No. 20 2007 011 911.9, filed Aug. 24, 2007.

BACKGROUND OF THE INVENTION

The invention relates to an edge trim for pieces of furniture, comprising a meltable film.

From EP 1 163 864, a furniture panel and a method for manufacturing the same is known. There, a generic edge trim is described for which the meltable film can be welded to wood materials by means of laser technology.

When fixing the edge trim on the piece of furniture, it is difficult for some materials to achieve a secure grip on the piece of furniture.

What is needed therefore is a solution which provides an edge trim for a piece of furniture, which edge trim is fixable without a visible joint and adhesive-free on at least one edge of the piece of furniture, independent of the material of which the piece of furniture is made.

SUMMARY OF THE INVENTION

To solve this object, the invention provides an edge trim for pieces of furniture comprising a meltable film, wherein the molecular structure of the meltable film contains both polar and non-polar parts so that the edge trim can be connected to pieces of furniture made of different materials by a supply of energy, for example, by light and/or radiation. In this way, the meltable film can be connected directly by fusion in a material bonding manner to polar and non-polar materials.

A mechanical adhesion is achieved, for example, in that the meltable film penetrates into a piece of furniture's cell structure, embraces the same and cures. A specific adhesion is achieved by different effects: The meltable film containing polar as well as non-polar parts in the molecular structure shows a good affinity to materials such as wood to facilitate diffusion therein. For example, cellulose, which are contained in wood materials, and which contain OH-groups, show a strong dipolar character and hence adhesion to polar substances.

BRIEF DESCRIPTION OF THE FIGURES

FIG. 1 shows a schematic sectional view of an edge of a piece of furniture and an edge trim according to the invention to be bonded thereon.

FIG. 2 shows a schematic sectional view of an edge of a piece of furniture and the edge trim according to the invention bonded thereon.

FIG. 3 shows a schematic and perspective view of an edge of a piece of furniture with a partially bonded edge trim according to the invention for illustration of a method for attaching the edge trim on the edge of the piece of furniture.

DETAILED DESCRIPTION OF THE PREFERRED EMBODIMENT(S)

The edge trim 1 according to the invention is described below with reference to the attached Figures.

The edge trim 1 according to the invention for pieces of furniture 4 comprises a meltable film 3 which contains polar as well as non-polar portions within the molecular structure. For this, the meltable film 3 is made from a material which is chemically modified so that it contains polar as well as non-polar portions in the molecular structure. Thereby, the meltable film 3 can be bonded directly by fusion in a material bonding manner to polar or non-polar materials. In the simplest variant, the edge trim 1 comprises exclusively the meltable film 3, i.e., the edge trim 1 is made from the chemically modified material which contains polar as well as non-polar portions within the molecular structure.

The preferred edge trim 1 for pieces of furniture 4 comprises a structural film 2 made from the chemically modified material which contains polar as well as non-polar portions in the molecular structure. Between the structural film 2 and the meltable film 3, none, one, or more intermediate films can be provided so that the structural film 2 and the meltable film 3 are connected at least indirectly, preferably connected directly. The structural film 2 can be omitted when the meltable film 3 has a sufficient thickness to add the necessary rigidity to the edge trim 1. Since the chemically modified material of the meltable film 3 is generally more expensive than the material of the structural film 2, the variant with the structural film 2 is preferred.

FIG. 1 shows a schematic sectional view of an edge of a piece of furniture 4 and an edge trim 1 according to the invention to be bonded thereon.

As a structural film 2 within the meaning of the invention, a film is designated which substantially gives the edge trim 1 its structure. A material of the structural film 2 can be selected from any materials, e.g. the group of wood materials, wood substitutes, metals, glasses, plastics, stones, ceramics, or combinations thereof.

A preferred embodiment of the invention relates to an edge trim according to the preceding embodiment, wherein the edge trim comprises a structural film which is connected to the meltable film. This measure has the advantage that the structural film gives the edge trim the real structure, regardless of the function of the meltable film, wherein each of the meltable film and the structural film can be configured functionally.

It can be advantageous when the meltable film comprises polar and/or non-polar reactive molecule groups so that adhesive, and/or covalent, and/or ionic bonds can be achieved. The best results during bonding of the edge trims according to the invention can be obtained when the polymer of the meltable film has a very good flowability.

Such polar and/or reactive groups can be incorporated in the molecular structure of the meltable film in a simple manner by, e.g., appropriate copolymerization and/or grafting, and or subsequent surface treatment (flame treatment, corona or plasma method). In addition, the reactive groups can form chemical bonds in the piece of furniture between the meltable film and the respective bonding partner, thereby providing a particularly high bonding strength.

It can prove to be helpful when the meltable film comprises molecular groups based on carboxylic acids, or their esters or salts, respectively, in particular acrylic acid, acryl ester, methacrylic acid, methacrylic ester, methyl methacrylic ester; epoxides, isocyanates, phenol formaldehyde resin, silanes, titanates, alcohols, amides, imides, ammonium compounds or sulfonic acids or their esters, respectively, or salts, or the like.

Preferably, the meltable meltable film comprises one or more of the molecular groups selected from these groups or mixtures thereof.

However, it is also within the scope of the invention to use so-called blocked isocyanates and the like which reach their reactivity only at defined activation temperatures.

A further preferred embodiment of the invention relates to an edge trim according to any of the preceding embodiments, wherein the structural film is made from a thermoplastic polymer, preferably polypropylene, acrylonitrile-butadiene-styrene copolymer, polyvinyl chloride, polymethyl methacrylate, polyethylene terephthalate, polyethylene, styrene-ethylene-butadiene-styrene block copolymer, and polyamide, and the like. This measure has the advantage that the material is inexpensively available and easy to process.

A further preferred embodiment of the invention relates to an edge trim according to any one of the preceding embodiments, wherein the meltable film is based on a thermoplastic polymer, preferably polypropylene, acrylonitrile-butadiene-styrene copolymer, polyvinyl chloride, polymethyl methacrylate, polyethylene terephthalate, polyethylene, styrene-ethylene-butadiene-styrene block copolymer, and polyamide, and the like. This measure has the advantage that this material is inexpensively available and good to process, and, in addition, it can be chemically modified in a simple manner.

In a further preferred embodiment, the meltable film is formed as a thermoplastic functional film which allows it for the first time to fix, adhesive-free and without a visible joint, an edge trim according to the above described embodiments on a narrow side of a piece of furniture.

A further preferred embodiment of the invention relates to an edge trim according to any one of the preceding embodiments, wherein the meltable film is based on the material from which the structural film is made. This measure has the advantage that a particularly strong bond between the films of the edge trim is generated.

A further preferred embodiment of the invention relates to a profiled trim according to any one of the preceding embodiments, wherein the meltable film consists of a blend which consists of at least one of the above-mentioned thermoplastic polymers, at least a further polymer which comprises the above-mentioned polar and/or reactive molecule groups, and additives.

A further preferred embodiment of the invention relates to an edge trim according to any one of the preceding embodiments, wherein the structural film and the meltable meltable film are connected an adhesive bond. This measure has the advantage that the films of the edge trim are bonded in a particularly firm manner.

A further preferred embodiment of the invention relates to an edge trim according to any one of the preceding embodiments, wherein the structural film and the meltable film are coextruded. This measure has the advantage that the shaping of the edge trim proves to be particularly simple.

A further preferred embodiment of the invention relates to an edge trim according to one of the preceding embodiments, wherein the material of the meltable film has a lower melting point than the material of the structural film. This measure has the advantage that during heating the edge trim up to a temperature above the melting point of the meltable film, but below the melting point of the structural film, only the meltable film starts to melt and reaches a viscous and ductile state while the structural film maintains its solid unchanged state.

A further preferred embodiment of the invention relates to an edge trim according to any one of the preceding embodiments, wherein the material of the meltable film is a copolymer, preferably a graft polymer, preferred maleic anhydride grafted polypropylene. This measure has the advantage that the material composition, in particular the portion of polar groups in the molecular structure, and hence the material properties can be adjusted selectively.

A further preferred embodiment of the invention relates to an edge trim according to any one of the preceding embodiments, wherein the meltable film contains energy-absorbing additives, preferably light- and/or radiation-absorbing additives, for example, laser pigments. This measure has the advantage that the meltable film can be selectively energized and can be heated above the melting point. Preferably, the energy-absorbing additives are contained in certain melting sections in the meltable film which are fused selectively, wherein the melting sections can be arranged in any pattern, e.g., as parallel lines along the longitudinal edge side of the edge trim.

A further preferred embodiment of the invention relates to an edge trim according to any one of the preceding embodiment, wherein the structural film forms the top film of the edge trim which defines a top side or visible side, respectively, of the edge trim. This measure has the advantage that the appearance of the edge trim is unchanged on the visible side after fusing and welding the meltable film on a piece of furniture, e.g. a wooden panel (particle board, MDF board).

A further preferred embodiment of the invention relates to an edge trim according to any one of the preceding embodiments, wherein the top side of the edge trim comprises a decor. This measure has the advantage that the edge trim, despite a substantially identical structural configuration, can comprise different decorations, e.g. a decoration matching the placement area of a piece of furniture.

A further preferred embodiment of the invention relates to an edge trim according to any one of the preceding embodiments, wherein the meltable film forms the bottom film of the edge trim which defines a bottom side or installation side, respectively, of the edge face. This measure has the advantage that the meltable film can be welded directly to a front, to be the covered side of a piece of furniture, e.g. a wooden panel (particle board, MDF-board).

In a further advantageous embodiment of the invention, the meltable film comprises additives, such as e.g. dyestuffs, pigments, and the like, which result in an advantageous color match between the meltable film and the cover film, and also to the top side of the piece of furniture. The visible joint known from the prior art between the edge of the piece of furniture and the cover film is thus avoided.

A further preferred embodiment of the invention relates to an edge trim according to any one of the preceding embodiments, wherein the structural film comprises a thickness of 0.8 to 1.6 mm, preferably 1.0 to 5.0 mm. This measure has the advantage that the structural film adds a sufficiently rigid structure to the edge trim.

A further preferred embodiment of the invention relates to an edge trim according to any one of the preceding embodiments, wherein the meltable film comprises a thickness of 0.1 to 0.5 mm, preferably 0.2 to 0.5 mm. This measure has the advantage that the meltable film is carried out only in a required thickness to complete the bonding to the piece of furniture. Thereby, material of the meltable film, which is more expensive compared to the material of the structural film, can be saved.

A further preferred embodiment of the invention relates to a piece of furniture with an edge trim according to any one of the preceding embodiments, wherein at least sections of the meltable film are connected to an edge of the piece of furniture in a material bonding and/or chemical manner. This measure has the advantage that the meltable film is connected in a material bonding and/or chemical bonding manner, and, if necessary, is also connected in a positively locking manner with the piece of furniture. By the partial welding, after which the meltable film is welded to the edge of the piece of furniture only in sections, but with the edge completely covered by the edge trim, the meltable film is to be energized only on selected positions so that time and energy are saved. The expression "chemically connected" designates a chemical bonding based on a chemical reaction between a reactive molecule group contained in the meltable film and an appropriate bonding partner, respectively the edge of the piece of furniture. For this, the reactive molecule group contained in the meltable film and the bonding partner are not limited as long as they are able to form a chemical bond with each other. The chemical bond between the molecule group in the meltable film and the respective bonding partner in the piece of furniture provides for a particularly high bonding strength.

A further preferred embodiment of the invention relates to a piece of furniture according to the preceding embodiment, wherein the bottom side of the edge trim is connected with the full surface with the edge of the piece of furniture in a material bonding and/or chemically bonding manner. This measure has the advantage that the meltable film is securely and durably connected with the piece of furniture.

A further preferred embodiment of the invention relates to a piece of furniture according to any one of the preceding embodiments, wherein the material of the piece of furniture is selected from a group of wood materials, wood substitutes, metals, glasses, plastics, stones, ceramics, or combinations thereof. This measure has the advantage that with respect to the material selection of the piece of furniture, the greatest possible freedom exists. Wood contains, for example, approx. 40% cellulose, approx. 25% holocellulose, and approx. 30% lignin. Cellulose is a linear chain molecule (up to 8 μm long) and is, in particular, responsible for the tensile strength of the wood. The holocelluloses are composed of different sugars, the chains are substantially shorter and comprise side groups and arborizations. The holocelluloses are connected with the lignin in the cell wall by covalent bonds. In particular the celluloses comprise a variety of OH-groups which are necessary for the inner cohesion of the wood, but can also be used for the outer bonding of the meltable film. These OH-groups are particularly suitable to form a chemical bond with the reactive molecule groups contained in the meltable film.

Principally, all materials which have appropriate reactive groups on the surface, which come into contact with the edges of, for example, pieces of furniture, are suitable for chemical bonds. If necessary, the materials can be surface-modified first if a chemical bond between edge trim and furniture material is desired and the materials per se do not comprise any or not enough chemically reactive bonding partners.

A further preferred embodiment of the invention relates to a piece of furniture according to any one of the preceding embodiments, wherein the material of the structural film is selected from a group of wood materials, wood substitutes, metals, glasses, plastics, stones, ceramics, or combinations thereof. This measure has the advantage that with respect to the material selection, the greatest possible freedom exists.

In a preferred exemplary embodiment, the structural film 2 is made from a thermoplastic polymer, preferred polypropylene, acrylonitrile-butadiene-styrene copolymer, polyvinyl chloride, polymethyl methacrylate, polyethylene terephthalate, and the like.

In the shown exemplary embodiments, the structural film 2 forms at the same time the top film 2 of the edge trim 1, which defines a top side or visible side 20, respectively, of the edge trim 1. Alternatively, above the structural film 2, one or more films are arranged, for example a decor film or decor layer, respectively, with a decorated surface. The structural film 2 comprises a thickness of 0.8 mm to 5.0 mm, preferably 1.0 to 3.0 mm.

Within the scope of this description, as meltable film 3, a film is designated which consists of a meltable material and which preferably softens upon temperature increase above the melting point, and takes a viscous or ductile state, respectively, and solidifies again during cooling.

The material of the meltable film 3 is chemically modified in such a manner, that it contains polar, and/or non-polar, and/or reactive molecule groups. Thus, the material of the meltable film 3 is also designated as compatibly facilitator. The material of the meltable film 3 can be bonded by fusion directly to polar and non-polar materials. The meltable film 3 is preferably based on the same material as the structural film 2, i.e. on a non-polar material, preferably plastic, preferably polypropylene, acrylonitrile-butadiene-styrene copolymer, polyvinyl chloride, polymethyl methacrylate, polyethylene terephthalate, and the like, but is chemically modified. In particular, the material of the meltable film 3 is a copolymer, preferably a grafted copolymer, preferred a maleic anhydride grafted polypropylene. The material of the meltable film 3 contains a proportion of up to four percent polar and/or reactive groups in the molecular structure, preferably between 0.5 and 2%, preferably 1%. The meltable film 3 has a thickness of 0.1 mm to 1.5 mm, preferably 0.2 mm to 0.5 mm. Preferred, the meltable film contains one or more of the molecular groups based on carboxylic acid or their ester or salts, in particular acrylic acid, acrylic ester, metharcrylic acid, methacrylic ester, methyl methacrylic ester; epoxides, isocyanates, phenol formaldehyde resin, silanes, titanates, alcohols, amides, imides, ammonium compounds or sulfonic acids or their esters, respectively, or salts, or the like.

The structural film 2 and the meltable film 3 are preferably connected in a material bonding manner, preferred coextruded. The material of the meltable film 3 has preferably a lower melting point than the material of the structural film 2. If the edge trim 1 is heated up to a specified temperature which is above the melting point of the material of the meltable film 3, but below the melting point of the structural film 2, only the material of the meltable film 3 is softened or melted, respectively, which is desired.

FIG. 3 shows a schematic and perspective view of a piece of furniture 4 with the edge trim 1 according to the invention, wherein the meltable film 3 of the edge trim 1 is directly connected in a material bonding manner with an edge 40 of the piece of furniture 4, or is in process to be connected, respectively.

The piece of furniture 4 comprises a board (e.g. table board, kitchen counter top, etc.) made from a material which is selected from any materials, e.g. the group of wood materials, wood substitutes, metals, glasses, plastics, stones, ceramics, or combinations thereof.

In the present example, the piece of furniture 4 is a board made from a wood material, in particular a particleboard or a MDF-board. The piece of furniture 4 comprises edges 40 which are defined and bordered by edge sides 41, a top side or placement side 42, and a bottom side (not shown).

In the exemplary embodiment according to FIG. 3, the edge trim 1 comprises the preferred configuration with a structural film 2 defining the visible side 20, and a meltable film 3 defining the installation side 30, and comprises a flexible structure. The material of the structural film 2 is polypropylene. The material of the meltable film 3 is a maleic anhydride grafted polypropylene. The edge trim 1 is moved towards the edge 40 of the piece of furniture to be covered by means of a substantially conventional method, wherein directly before the move of the edge trim 1 towards the edge 40, energy is applied onto the installation side 30 of the meltable film 3 by means of an energy supply means 6. By applying energy, the meltable film 3 is heated.

The energy is supplied in any form, preferably in the form of laser light, hot air, microwaves, ultra sound, etc., wherein an energy absorption means (e.g. laser pigments), which is preferably contained in the meltable film 3, absorbs the energy supplied by the energy supply means 6 and heats the meltable film 3 above the melting point. For this, it is not required that the meltable film 3 is completely fused, but that the meltable film 3 is softened only on the installation side 30 so that at least in sections, the meltable film 3 takes a viscous or ductile state, respectively, and by pushing the edge trim 1 onto the edge 40 of the piece of furniture 4, engages mechanically with the preferably rough surface structure of the edge 40 of the piece of furniture 4. By means of the determined chemical properties of the edge trim 1, in addition, the meltable film 3 is connected with the edge 40 of the piece of furniture 4 in a material bonding manner.

By the energy supply means 6, preferably enough energy is supplied to a meltable film 3 comprising reactive molecular groups that an activation energy is exceeded to initiate a chemical reaction and to achieve a chemical bond between the meltable film 3 and the respective bonding partner, here, the piece of furniture 4. Applying energy to the meltable film 3 to cause a chemical reaction and a chemical bond between the meltable film 3 and the edge 40 of the piece of furniture 4 to connect the meltable film 3 and the edge 40 of the piece of furniture 4 in a chemically manner, is carried out selectively at the same time of or independent from the energy supply to the meltable film 3 for melting the meltable film 3.

The activation energy to achieve a chemical bond between the meltable film 3 and the respective bonding partner, here, the piece of furniture 4, is influenced, among other things, by the following parameters:

Temperature
Radiation (laser, UV-light)
Contact force
Joint gap
Film thickness
Curing time
Ambient air (humidity, oxygen content)
Substrate surface
Pretreatment For a meltable film 3 of maleic anhydride grafted polypropylene (PP-MAH), the meltable film 3 is heated, for example, to a temperature of higher than +135° C. Normally, this temperature is high enough so that the maleic anhydride (MAH) reacts with the OH-groups of the wood to achieve a chemical bond.

Normally, the edge trim 1 is fabricated oversized and is moved towards the edge 40 of the piece of furniture 4 in such a manner that on both sides of the edge trim 1 an overhang area between the dashed lines 21 and the edges of the edge trim 1 is generated in the bonded state. This material overhang is removed by means of a machining operation so that the edges on the longitudinal side of the edge trim 1 and the placement face 42 as well as the bottom side (not shown) of the piece of furniture 4 are flush.

It is sufficient when the installation side 30 of the edge trim 1 is connected at least in sections with the edge 40 of the piece of furniture 4 in a material bonding and/or chemical bonding manner, or is welded, respectively. For this, point-shaped, line-shaped or checkered welding patterns are possible which are achieved, for example, by selectively applying energy-absorbing additives onto the meltable film 3. However, it is preferred that the meltable film 3 is connected or welded, respectively, with the full surface to the edge 40 of the piece of furniture 4. This applies in particular to the corner areas of the piece of furniture 4, where the edge trims 1, for example, are arranged adjacently at the corner, to avoid the edge trims 1 peeling off starting at the corner areas of the piece of furniture 4

FIG. 2 shows the connected condition of the edge trim 1 according to the invention and the piece of furniture 4. Here is illustrated how the material of the meltable film 3, which is first meltable and subsequently solidified, engages with the rough or porous or micro-porous surface structure at the edge 40 of the piece of furniture 4 so that the meltable film 3 is connected in an adhesive bond, and—if the surface structure of the piece of furniture 4 allows it—also in a positively locking manner with the piece of furniture 4.

Particularly preferred variants of the edge trim 1 according to the invention are mentioned below under specification of the respective materials:

| | |
|---|---|
| Variant 1 (PP-edge) | |
| Structural film: | Polypropylene (PP); |
| meltable film: | PP-maleic anhydride |
| Variant 2 (ABS-edge) | |
| Structural film: | Acrylonitrile-butadiene-styrene copolymer (ABS); |
| meltable film: | Ethylene vinyl acetate, ethylene vinyl acetate-maleic anhydride, ethylene methacrylate, polyurethane (thermoplastic), ABS-maleic anhydride or styrene-ethylene-butadiene-styrene-block polymer-maleic anhydride, adhesion-modified copolyamide; |
| Variant 3 (PVC-edge) | |
| Structural film: | Polyvinyl chloride (PVC); |
| meltable film: | PVC-ethylene vinyl acetate-copolymer or PVC-polyacrylic ester, adhesion-modified copolyamid; ABS-maleic anhydride |
| Variant 4 (PMMA/PET-edge) | |
| Structural film: | Polymethyl methacrylate (PMMA) or polyethylene terephthalate PET); |
| meltable film: | Ethylene butylene acrylate, ethylene methacrylate, ethylene vinyl acetate, epoxidized acrylate, polyester (maleic anhydride grafted) |
| Variant 5 (PP-edge) | |
| Structural and meltable film: | PP-maleic anhydride grafted |

The invention claimed is:

1. A piece of furniture having a rough edge connected to a composite edge trim, the rough edge comprising a wood-based material, wherein the composite edge trim comprises a meltable film and a structural film connected to the meltable film, wherein the meltable film contains both polar and non-polar parts in the molecular structure and is a grafted copolymer, the edge trim connected at least in sections in an adhesive and interlocking bond that adheres to and interlocks with the said rough edge of the piece of furniture.

2. The piece of furniture according to claim 1, wherein the structural film is produced from a thermoplastic polymer.

3. The piece of furniture according to claim 1, wherein the meltable film comprises a thermoplastic polymer, selected from the group of thermoplastic polymers consisting of polypropylene, acrylonitrile-butadiene-styrene copolymer, polyvinyl chloride, polymethyl methacrylate, and polyethylene terephthalate.

4. The piece of furniture according to claim 1, wherein the meltable film is based on the material from which the structural film is made.

5. The piece of furniture according to claim 1, wherein the structural film and the meltable film are connected in an adhesive bond.

6. The piece of furniture according to claim 1, wherein the structural film and the meltable film are coextruded.

7. The piece of furniture according to claim 1, wherein the material of the meltable film has a lower melting point than the material of the structural film.

8. The piece of furniture according to claim 1, wherein the material of the meltable film is a maleic anhydride grafted polypropylene.

9. The piece of furniture according to claim 1, wherein the meltable film contains energy absorbing additives.

10. The piece of furniture according to claim 1, wherein the meltable film of the edge trim defines an underside or abutting side of the edge trim.

11. The piece of furniture according to claim 1, wherein the structural film forms the top film of the edge trim, which defines a top side or visible side of the edge trim.

12. The piece of furniture according to claim 1, wherein the top side of the edge trim comprises a decor.

13. The piece of furniture according to claim 1, wherein the meltable film forms the bottom film of the edge trim, which defines a bottom side or installation side of the edge trim.

14. The piece of furniture according to claim 1, wherein the structural film comprises a thickness of 0.8 to 5.0 mm.

15. The piece of furniture according to claim 1, wherein the meltable film comprises a thickness of 0.1 to 1.5 mm.

16. The piece of furniture according to claim 1, wherein the bottom side of the edge trim is connected with the full surface with the edge of the piece of furniture in a material bonding manner.

17. The piece of furniture according to claim 1, wherein the material of the piece of furniture is selected from the group of materials consisting of wood materials, wood substitutes, metals, glasses, plastics, stones, the ceramics, and combinations thereof.

18. The piece of furniture according to claim 1, wherein the material of the structural film is selected from the group of materials consisting of wood materials, wood substitutes, metals, glasses, plastics, stones, ceramics, and combinations thereof.

19. A method of fabricating the piece of furniture of claim 1, the method comprising the steps of:
(a) energizing the meltable film of the edge trim so as to at least partially melt the film, which comprises a grafted copolymer;
(b) pressing the meltable film in an at least partial molten state against a rough edge of the piece of furniture;
(c) allowing the at least partially melted meltable film to flow into interstices of the rough edge; and
(d) allowing the meltable film to solidify, and so adhere to and interlock with the rough edge in a material bonding manner.

20. The piece of furniture according to claim 2, wherein the thermoplastic polymer is selected from the group of thermoplastic polymers consisting of polypropylene, acrylonitrile-butadiene-styrene copolymer, polyvinyl chloride, polymethyl methacrylate, and polyethylene terephthalate.

21. The piece of furniture according to claim 9, wherein the energy absorbing additives are selected from the group consisting of light- and radiation-absorbing additives.

22. The piece of furniture according to claim 9 wherein the energy absorbing additive is a laser pigment.

23. The piece of furniture according to claim 1, wherein the structural film comprises a thickness of 1.0 to 3.0 mm.

24. The piece of furniture according to claim 1, wherein the meltable film comprises a thickness of 0.2 to 0.5 mm.

\* \* \* \* \*

US008603610C1

(12) EX PARTE REEXAMINATION CERTIFICATE (11506th)
United States Patent
Krämer et al.

(10) Number: US 8,603,610 C1
(45) Certificate Issued: Apr. 23, 2019

(54) EDGE TRIM FOR PIECES OF FURNITURE

(75) Inventors: Uwe Krämer, Rehau (DE); Peter Glaser, Rehau (DE)

(73) Assignee: REHAU AG + CO, Rehau (DE)

Reexamination Request:
No. 90/014,039, Oct. 27, 2017

Reexamination Certificate for:
Patent No.: 8,603,610
Issued: Dec. 10, 2013
Appl. No.: 12/666,649
PCT Filed: Jun. 6, 2008
PCT No.: PCT/EP2008/004520
§ 371 (c)(1),
(2), (4) Date: May 21, 2010
PCT Pub. No.: WO2009/026977
PCT Pub. Date: Mar. 5, 2009

(30) Foreign Application Priority Data

Aug. 24, 2007 (DE) .................... 20 2007 011 911 U

(51) Int. Cl.
*B27D 5/00* (2006.01)
*B32B 7/12* (2006.01)
(Continued)

(52) U.S. Cl.
CPC .............. *B32B 7/12* (2013.01); *A47B 96/201* (2013.01); *B27D 5/003* (2013.01); *B29C 63/0026* (2013.01); *B29C 65/02* (2013.01); *B29C 65/1432* (2013.01); *B29C 65/1483* (2013.01); *B29C 65/1632* (2013.01); *B29C 65/1683* (2013.01); *B29C 65/3456* (2013.01); *B29C 65/4815* (2013.01); *B29C 65/5057* (2013.01); *B29C 66/112* (2013.01); *B29C 66/114* (2013.01); *B29C 66/3032* (2013.01); *B29C 66/30322* (2013.01); *B29C 66/30326* (2013.01); *B29C 66/472* (2013.01); *B29C 66/712* (2013.01); *B29C 66/723* (2013.01); *B29C 66/7392* (2013.01); *B29C 66/73162* (2013.01); *B29C 66/7487* (2013.01); *B32B 27/08* (2013.01); *B32B 27/32* (2013.01); *B29C 65/08* (2013.01); *B29C 65/103* (2013.01); *B29C 65/1406* (2013.01); *B29C 65/1425* (2013.01); *B29C 65/1454* (2013.01); *B29C 65/1654* (2013.01); *B29C 65/483* (2013.01); *B29C 65/4865* (2013.01); *B29C 66/022* (2013.01); *B29C 66/71* (2013.01); *B29C 66/72321* (2013.01); *B29C 66/72325* (2013.01); *B29C 66/72326* (2013.01); *B29C 66/72329* (2013.01); *B29K 2311/14* (2013.01); *B29K 2705/00* (2013.01); *B29K 2709/02* (2013.01); *B29K 2709/06* (2013.01); *B29K 2709/08* (2013.01); *B29K 2711/00* (2013.01); *B29L 2031/44* (2013.01); *Y10T 428/24777* (2015.01); *Y10T 428/24802* (2015.01); *Y10T 428/269* (2015.01); *Y10T 428/2809* (2015.01); *Y10T 428/2817* (2015.01); *Y10T 428/2826* (2015.01); *Y10T 428/31616* (2015.04); *Y10T 428/31645* (2015.04); *Y10T 428/31681* (2015.04); *Y10T 428/31692* (2015.04); *Y10T 428/31855* (2015.04); *Y10T 428/31895* (2015.04)

(58) Field of Classification Search
None
See application file for complete search history.

(56) References Cited

To view the complete listing of prior art documents cited during the proceeding for Reexamination Control Number 90/014,039, please refer to the USPTO's public Patent Application Information Retrieval (PAIR) system under the Display References tab.

*Primary Examiner* — Carlos N Lopez

(57) ABSTRACT

The invention relates to an edge trim for pieces of furniture, comprising a meltable film. In order to improve a generic edge trim such that the same is more versatile and can especially be mounted on a wider selection of surfaces, the molecular structure of the meltable film contains both polar and non-polar parts.

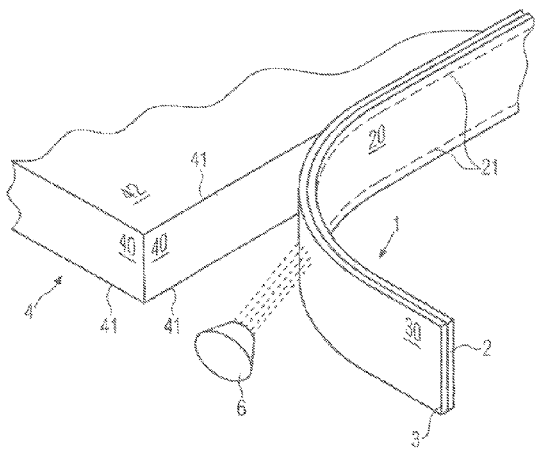

(51) Int. Cl.
*A47B 96/20* (2006.01)
*B29C 63/00* (2006.01)
*B29C 65/00* (2006.01)
*B29C 65/02* (2006.01)
*B29C 65/08* (2006.01)
*B29C 65/10* (2006.01)
*B29C 65/14* (2006.01)
*B29C 65/16* (2006.01)
*B29C 65/34* (2006.01)
*B29C 65/48* (2006.01)
*B29C 65/50* (2006.01)
*B29K 23/00* (2006.01)
*B29K 27/06* (2006.01)
*B29K 33/00* (2006.01)
*B29K 55/02* (2006.01)
*B29K 67/00* (2006.01)
*B29L 31/44* (2006.01)
*B32B 27/08* (2006.01)
*B32B 27/32* (2006.01)
*B29K 311/14* (2006.01)
*B29K 705/00* (2006.01)
*B29K 709/02* (2006.01)
*B29K 709/06* (2006.01)
*B29K 709/08* (2006.01)
*B29K 711/00* (2006.01)

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 14 is cancelled.

Claims 1 and 24 are determined to be patentable as amended.

Claims 2-13 and 15-23, dependent on an amended claim, are determined to be patentable.

New claims 25-45 are added and determined to be patentable.

1. A piece of furniture having a rough edge connected to a composite edge trim, the rough edge comprising a wood-based material, wherein the composite edge trim comprises a meltable film and a structural film connected to the meltable film, wherein the meltable film contains both polar and non-polar parts in the molecular structure and is a grafted copolymer, *the meltable film of* the edge trim connected at least in sections in an adhesive and interlocking bond that adheres to and interlocks with the said rough edge of the piece of furniture, *and the structural film comprises a thickness of 0.8 to 5.0 mm.*

24. [The] *A* piece of furniture [according to claim 1,] *having a rough edge connected to a composite edge trim, the rough edge comprising a wood-based material, wherein the composite edge trim comprises a meltable film and a structural film connected to the meltable film, wherein the meltable film contains both polar and non-polar parts in the molecular structure and is a grafted copolymer, the meltable film of the edge trim connected at least in sections in an adhesive and interlocking bond that adheres to and interlocks with the said rough edge of the piece of furniture, and* the meltable film comprises a thickness of 0.2 to 0.5 mm.

25. *The piece of furniture according to claim 24, wherein the structural film is produced from a thermoplastic polymer.*

26. *The piece of furniture according to claim 24, wherein the meltable film comprises a thermoplastic polymer, selected from the group of thermoplastic polymers consisting of polypropylene, acrylonitrile-butadiene-styrene copolymer, polyvinyl chloride, polymethyl methacrylate, and polyethylene terephthalate.*

27. *The piece of furniture according to claim 24, wherein the meltable film is based on the material from which the structural film is made.*

28. *The piece of furniture according to claim 24, wherein the structural film and the meltable film are connected in an adhesive bond.*

29. *The piece of furniture according to claim 24, wherein the structural film and the meltable film are coextruded.*

30. *The piece of furniture according to claim 24, wherein the material of the meltable film has a lower melting point than the material of the structural film.*

31. *The piece of furniture according to claim 24, wherein the material of the meltable film is a maleic anhydride grafted polypropylene.*

32. *The piece of furniture according to claim 24, wherein the meltable film contains energy absorbing additives.*

33. *The piece of furniture according to claim 24, wherein the meltable film of the edge trim defines an underside or abutting side of the edge trim.*

34. *The piece of furniture according to claim 24, wherein the structural film forms the top film of the edge trim, which defines a top side or visible side of the edge trim.*

35. *The piece of furniture according to claim 24, wherein the top side of the edge trim comprises a decor.*

36. *The piece of furniture according to claim 24, wherein the meltable film forms the bottom film of the edge trim, which defines a bottom side or installation side of the edge trim.*

37. *The piece of furniture according to claim 24, wherein the structural film comprises a thickness of 0.8 to 5.0 mm.*

38. *The piece of furniture according to claim 24, wherein the bottom side of the edge trim is connected with the full surface with the edge of the piece of furniture in a material bonding manner.*

39. *The piece of furniture according to claim 24, wherein the material of the piece of furniture is selected from the group of materials consisting of wood materials, wood substitutes, metals, glasses, plastics, stones, the ceramics, and combinations thereof.*

40. *The piece of furniture according to claim 24, wherein the material of the structural film is selected from the group of materials consisting of wood materials, wood substitutes, metals, glasses, plastics, stones, ceramics, and combinations thereof.*

41. *A method of fabricating the piece of furniture of claim 24, the method comprising the steps of:*
   (a) *energizing the meltable film of the edge trim so as to at least partially melt the film, which comprises a grafted copolymer;*
   (b) *pressing the meltable film in an at least partial molten state against a rough edge of the piece of furniture;*
   (c) *allowing the at least partially melted meltable film to flow into interstices of the rough edge; and*
   (d) *allowing the meltable film to solidify, and so adhere to and interlock with the rough edge in a material bonding manner.*

42. *The piece of furniture according to claim 25, wherein the thermoplastic polymer is selected from the group of thermoplastic polymers consisting of polypropylene, acrylonitrile-butadiene-styrene copolymer, polyvinyl chloride, polymethyl methacrylate, and polyethylene terephthalate.*

43. *The piece of furniture according to claim 32, wherein the energy absorbing additives are selected from the group consisting of light- and radiation-absorbing additives.*

44. *The piece of furniture according to claim 32 wherein the energy absorbing additive is a laser pigment.*

45. *The piece of furniture according to claim 24, wherein the structural film comprises a thickness of 1.0 to 3.0 mm.*

* * * * *

(12) EX PARTE REEXAMINATION CERTIFICATE (11775th)
United States Patent
Krämer et al.

(10) Number: US 8,603,610 C2
(45) Certificate Issued: Dec. 18, 2020

(54) EDGE TRIM FOR PIECES OF FURNITURE

(75) Inventors: Uwe Krämer, Rehau (DE); Peter Glaser, Rehau (DE)

(73) Assignee: REHAU AG + CO, Rehau (DE)

Reexamination Request:
No. 90/014,361, Aug. 9, 2019

Reexamination Certificate for:
Patent No.: 8,603,610
Issued: Dec. 10, 2013
Appl. No.: 12/666,649
PCT Filed: Jun. 6, 2008
PCT No.: PCT/EP2008/004520
§ 371 (c)(1),
(2), (4) Date: May 21, 2010
PCT Pub. No.: WO2009/026977
PCT Pub. Date: Mar. 5, 2009

Reexamination Certificate C1 8,603,610 issued Apr. 23, 2019

(30) Foreign Application Priority Data

Aug. 24, 2007 (DE) ............. 20 2007 011 911 U

(51) Int. Cl.
*B32B 7/12* (2006.01)
*B27D 5/00* (2006.01)
(Continued)

(52) U.S. Cl.
CPC .............. *B32B 7/12* (2013.01); *A47B 96/201* (2013.01); *B27D 5/003* (2013.01); *B29C 63/0026* (2013.01); *B29C 65/02* (2013.01); *B29C 65/1432* (2013.01); *B29C 65/1483* (2013.01); *B29C 65/1632* (2013.01); *B29C 65/1683* (2013.01); *B29C 65/3456* (2013.01); *B29C 65/4815* (2013.01); *B29C 65/5057* (2013.01); *B29C 66/112* (2013.01); *B29C 66/114* (2013.01); *B29C 66/3032* (2013.01); *B29C 66/30322* (2013.01); *B29C 66/30326* (2013.01); *B29C 66/472* (2013.01); *B29C 66/712* (2013.01); *B29C 66/723* (2013.01); *B29C 66/7392* (2013.01); *B29C 66/73162* (2013.01); *B29C 66/7487* (2013.01); *B32B 27/08* (2013.01); *B32B 27/32* (2013.01); *B29C 65/08* (2013.01); *B29C 65/103* (2013.01); *B29C 65/1406* (2013.01); *B29C 65/1425* (2013.01); *B29C 65/1454* (2013.01); *B29C 65/1654* (2013.01); *B29C 65/483* (2013.01); *B29C 65/4865* (2013.01); *B29C 66/022* (2013.01); *B29C 66/71* (2013.01); *B29C 66/72321* (2013.01); *B29C 66/72325* (2013.01); *B29C 66/72326* (2013.01); *B29C 66/72329* (2013.01); *B29K 2311/14* (2013.01); *B29K 2705/00* (2013.01); *B29K 2709/02* (2013.01); *B29K 2709/06* (2013.01); *B29K 2709/08* (2013.01); *B29K 2711/00* (2013.01); *B29L 2031/44* (2013.01); *Y10T 428/24777* (2015.01); *Y10T 428/24802* (2015.01); *Y10T 428/269* (2015.01); *Y10T 428/2809* (2015.01); *Y10T 428/2817* (2015.01); *Y10T 428/2826* (2015.01); *Y10T 428/31616* (2015.04);
(Continued)

(58) Field of Classification Search
None
See application file for complete search history.

(56) References Cited

To view the complete listing of prior art documents cited during the proceeding for Reexamination Control Number 90/014,361, please refer to the USPTO's public Patent Application Information Retrieval (PAIR) system under the Display References tab.

*Primary Examiner* — Krisanne M Jastrzab

(57) ABSTRACT

The invention relates to an edge trim for pieces of furniture, comprising a meltable film. In order to improve a generic edge trim such that the same is more versatile and can especially be mounted on a wider selection of surfaces, the molecular structure of the meltable film contains both polar and non-polar parts.

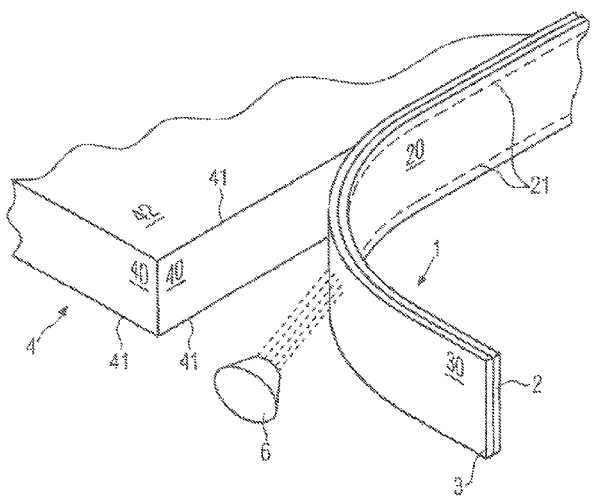

(51) Int. Cl.
*B29C 65/02* (2006.01)
*B29C 65/00* (2006.01)
*B32B 27/32* (2006.01)
*A47B 96/20* (2006.01)
*B29C 63/00* (2006.01)
*B29C 65/14* (2006.01)
*B29C 65/16* (2006.01)
*B29C 65/34* (2006.01)
*B29C 65/48* (2006.01)
*B29C 65/50* (2006.01)
*B32B 27/08* (2006.01)
*B29C 65/08* (2006.01)
*B29C 65/10* (2006.01)
*B29K 311/14* (2006.01)
*B29K 709/08* (2006.01)
*B29K 705/00* (2006.01)
*B29K 709/02* (2006.01)
*B29K 709/06* (2006.01)
*B29K 711/00* (2006.01)
*B29L 31/44* (2006.01)

(52) U.S. Cl.
CPC .................. *Y10T 428/31645* (2015.04); *Y10T 428/31681* (2015.04); *Y10T 428/31692* (2015.04); *Y10T 428/31855* (2015.04); *Y10T 428/31895* (2015.04)

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 14 was previously cancelled.

Claims 1 and 24 are determined to be patentable as amended.

Claims 2-13, 15-23 and 25-45, dependent on an amended claim, are determined to be patentable.

1. A piece of furniture having a rough edge connected to a composite edge trim, the rough edge comprising a wood-based material, wherein the composite edge trim comprises a meltable film and a structural film connected to the meltable film, wherein the meltable film contains both polar and non-polar parts in the molecular structure and is a grafted copolymer, the meltable film of the edge trim connected at least in sections in an adhesive and interlocking bond that adheres to and interlocks with the said rough edge of the piece of furniture, and the structural film comprises a thickness of 0.8 to 5.0 mm, *wherein the meltable film is made of a material containing a proportion of up to 4% polar groups as the polar part.*

24. A piece of furniture having a rough edge connected to a composite edge trim, the rough edge comprising a wood-based material, wherein the composite edge trim comprises a meltable film and a structural film connected to the meltable film, wherein the meltable film contains both polar and non-polar parts in the molecular structure and is a grafted copolymer, the meltable film of the edge trim connected at least in sections in an adhesive and interlocking bond that adheres to and interlocks with the said rough edge of the piece of furniture, and the meltable film comprises a thickness of 0.2 to 0.5 mm, *wherein the meltable film is made of a material containing a proportion of up to 4% polar groups as the polar part.*

\* \* \* \* \*